Patented Oct. 31, 1933

1,933,202

UNITED STATES PATENT OFFICE 1,933,202

METAL WORKING MACHINE

George F. Yager, Toledo, Ohio, assignor to The Bunting Brass and Bronze Company, Toledo, Ohio, a corporation of Ohio Application March 10, 1930. Serial No. 434,798

13 Claims. (Cl. 82—2)

This invention relates to metal working machines and more particularly to a machine for fashioning bushings, tubing and the like.

One of the principal objects of this invention is to provide a relatively simple machine composed of a comparatively few number of parts and operable to automatically and simultaneously finish the work to a predetermined size and chamfer opposite ends of the latter.

Other objects of this invention reside in the peculiar construction of the machine and the expedient manner in which the same functions to perform the various operations upon the work. These objects will be made more apparent as this description proceeds, especially when considered in connection with the accompanying drawings, wherein:

Figure 4 is an enlarged fragmentary sectional view showing the cutter heads in operative relation with the work.

Generally described, the machine illustrated herein is especially designed for finishing bushings and the like and comprises a work support 10 for holding a bushing in operative position between the axially spaced cutter heads 11 and 12. The cutter heads 11 and 12 are respectively mounted upon the coaxially arranged spindles 13 and 14 driven in timed relation to each other and operable to impart both axial and rotative movements to the cutter heads. Each of the heads 11 and 12 carries a plurality of cutters 15, 16 and 17 simultaneously operable to respectively finish opposite ends of the bushing to fashion the same to a predetermined length and to chamfer the inner and outer edges of the bushing as illustrated in Figure 4. As will be presently described, the cutter heads 11 and 12 are rotated at substantially the same speed in opposite directions with the result that the turning force exerted upon one end of the bushing by one set of cutters is substantially equal and counteracted by the turning force exerted by the other set of cutters upon the opposite end of the bushing and tending to rotate the same in the opposite direction. By virtue of the foregoing arrangement there is no tendency for the bushing to rotate in the work support permitting the bushing to be rigidly clamped in place with the minimum clamping force and thereby eliminating any danger of disturbing the circular contour of the bushing by the force necessary to clamp the same in operation position upon the work support.

Figure 1:
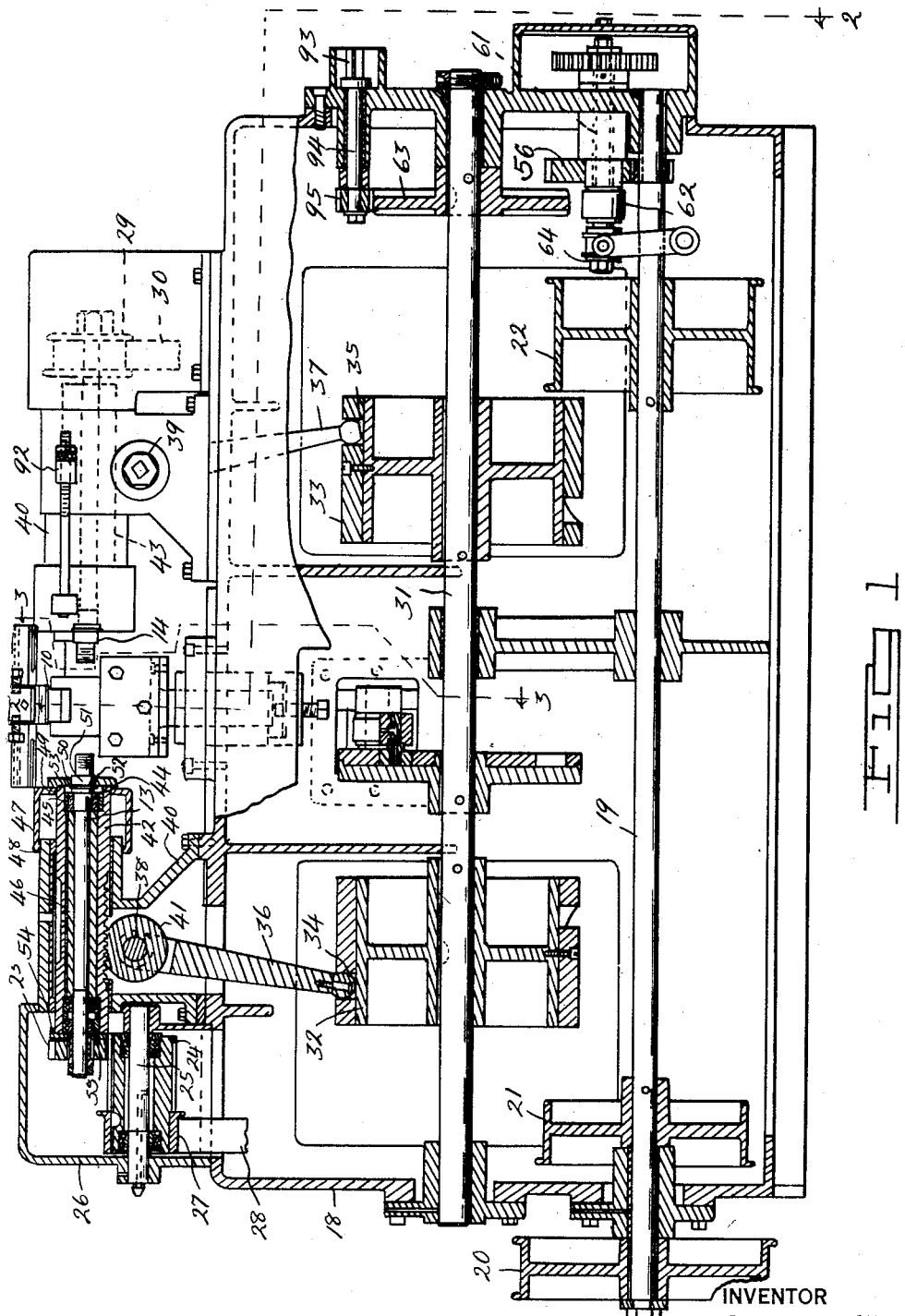
Figure 1 is a longitudinal sectional view through a machine constructed in accordance with this invention.

In detail, the machine illustrated herein comprises a frame 18 in the form of a housing having aligned openings in the end walls thereof within which a drive shaft 19 is journaled. The drive shaft 19 extends substantially the full length of the housing or frame 18 and has secured to the outer end thereof a main drive pulley 20 adapted to be operatively connected to a prime mover of any suitable design. Secured to the drive shaft 19 in axial spaced relation to each other is a pair of driven pulleys 21 and 22 respectively and operatively connected to the spindles 13 and 14 for rotating the same in opposite directions. In order to operatively connect the spindle 13 to the drive shaft 19, I provide a gear 23 secured to the outer end of the spindle and adapted to mesh with a splined sleeve 24 journaled upon a countershaft 25 which in turn is journaled within an extension 26 of the housing 18. Secured upon the outer end of the splined sleeve 24 is a pulley 27 arranged in substantially the same plane as the pulley 21 and connected thereto by means of a flexible driving member or belt 28. The construction is such as to rotate the spindle 13 from the drive shaft 19 in a direction opposite the direction of rotation of the latter shaft. The spindle 14 on the other hand is directly connected to the drive shaft 19 so as to rotate in the same direction as the latter shaft. As shown in Figure 1, the spindle 14 has secured to the outer end thereof a pulley 29 arranged in substantially the same plane as the pulley 22 and connected to the latter by means of a suitable belt 30. In this connection it should be understood that while the spindles 13 and 14 are rotated in opposite directions, the speed of operation thereof is substantially the same with the result that both ends of the bushing will be finished uniformly by the cutter heads 11 and 12 and there will be no tendency for the bushing to rotate while in clamped position upon the support as brought out in the preceding description.

As stated above, the spindles 13 and 14, in addition to being rotatable relative to the work support, are also reciprocable in timed relation to each other toward and from the work. The reciprocation of the spindles 13 and 14 is accomplished in the present instance by providing a cam shaft 31 having the opposite ends thereof journaled within the end walls of the housing and extending substantially parallel to the drive shaft 19. The cam shaft 31 has secured thereto in axial spaced relation within the frame 18 a pair of rotatable cams 32 and 33 having cam grooves 34 and 35 formed in the periphery thereof and adapted to receive the lower ends of the cam levers 36 and 37, respectively. The upper ends of the levers 36 and 37 are respectively secured to the rockshafts 38 and 39 journaled within suitable brackets 40 extending upwardly from the frame 18 and having the axes thereof arranged transversely to the axes of the spindles and cam shaft. Secured to each of the rockshafts 38 and 39 is a gear 41 adapted to mesh with the racks 42 and 43 which are in the form of sleeves surrounding the spindles 13 and 14, respectively. The sleeves 42 and 43 are non-rotatably mounted within the brackets 40 but are capable of a sliding movement axially of the spindles 13 and 14. As shown particularly in Figure 1, the opposite ends of each of the sleeves 42 and 43 are counter-bored as indicated at 44 for receiving the roller bearings 45 within which the opposite end portions of the spindles are journaled. Surrounding each of the spindles 13 and 14 within the sleeves 42 and 43 and rotatable as a unit with the spindles is a sleeve 46 having the end portions engaging the inner and outer roller bearings 45 and cooperating with the shoulders formed by the counter-bored portions 44 of the sleeves 42 and 43 to normally hold the bearings 45 in proper spaced relation to each other. As will be apparent from the above figure, the exterior diameter of the sleeves 46 is substantially less than the interior diameter of the tubular sleeves 42 and 43 with the result that the latter are free from engagement with the rotatable parts upon rotation of the same.

In order to transmit the reciprocable movement of the sleeves 42 and 43 to a corresponding movement of the spindles 13 and 14, respectively, I provide cap members 47 having the outer portions 48 thereof slidably engaging the brackets 40 and having internal annular shoulders 49 adjacent the inner ends thereof secured to the corresponding ends of the sleeves 42 and 43 so as to be capable of a sliding movement with the latter. The cap members 47 are apertured as at 50 to receive suitable enlarged portions 51 formed on the spindles 13 and 14 in rear of the cutter heads 11 and 12. The enlarged portions 51 are formed with annular flanges 52 arranged to engage the outer surfaces 53 of the cap members 47. The construction is such that movement of the sleeves 42 and 43 outwardly causes a corresponding movement of the spindles 13 and 14. In order to compel movement of the spindles 13 and 14 inwardly upon reciprocation of the sleeves 42 and 43 inwardly, I provide the cap members 54 secured to the outer ends of the sleeves 42 and 43 and having the inner portions 55 thereof engaging the outer bearing members 45. Thus from the foregoing it will be observed that while the sleeves 42 and 43 are held from rotation with the spindles 13 and 14, the latter are compelled to reciprocate with the sleeves as a unit. In this connection it is to be noted that during reciprocation of the spindle 13, the gear 23 slides longitudinally upon the splined sleeve 24 with the result that the spindle 13 may be rotated and reciprocated at the same time. The spindle 14 may also be rotated and reciprocated simultaneously and in order to compensate for the reciprocable movement thereof the pulley 22 is formed with a comparatively wide face permitting the belt 30 to slide axially of the pulley 22 upon reciprocation of the spindle 14.

As will be apparent from Figure 1 of the drawings, each of the cam members 32 and 33 for reciprocating the spindles 13 and 14, respectively, are identical in construction and are driven at substantially the same speed, as will be presently described, with the result that the spindles 13 and 14 will be moved simultaneously toward and away from the work support. The cam members 32 and 33 are driven at a reduced speed from the drive shaft 19 by means of the reduction gearing 56. In detail, the reduction gearing comprises a comparatively small gear 57 secured to the drive shaft 19 and adapted to mesh with a relatively larger gear 58 secured to the countershaft 59. The gear 58, on the other hand, meshes with a gear 60 secured to the clutch shaft 61 for driving the latter. Mounted on the clutch shaft 61 is a small gear 62 arranged in constant mesh with a comparatively large gear 63 secured to the cam shaft. Arranged upon the clutch shaft 61 adjacent the gear 62 is a slidable clutch collar 64 of any suitable design and adapted to be actuated by the control lever 65 to secure the gear 62 to the shaft 61 and thereby impart rotation to the cam shaft through the gear 63. From the foregoing it will be observed that the cam shaft and accordingly the cams 32 and 33 are rotated at a slower rate of speed than the drive shaft 19 and spindles 13 and 14 so as to effect a comparatively slow movement of the spindles 13 and 14 toward and from the work. The arrangement is such that the spindles 13 and 14 are gradually moved inwardly to bring the cutter heads 11 and 12 in operative relation with the bushing to finish the same, as specified above, and to gradually move the cutter heads away from the bushing to permit the latter to be withdrawn from the clamping device and another bushing clamped in operative position. In this connection it should be understood that the reciprocable movement of the spindles 13 and 14 is so slow as compared to the peripheral speed of the cutter heads as to permit the latter to efficiently fashion opposite ends of the bushing during the interval the cutter heads are being moved into operative position with the bushing and away from the bushing. In other words, during the normal operation of the machine the spindles are continuously reciprocated and rotated to successively fashion the opposite ends of the bushing without any attention whatsoever on the part of the operator. The speed of reciprocation of the spindles 13 and 14 may be readily varied when desired by merely changing the gear ratio of the gear train in the transmission hereinbefore set forth.

Figure 2:
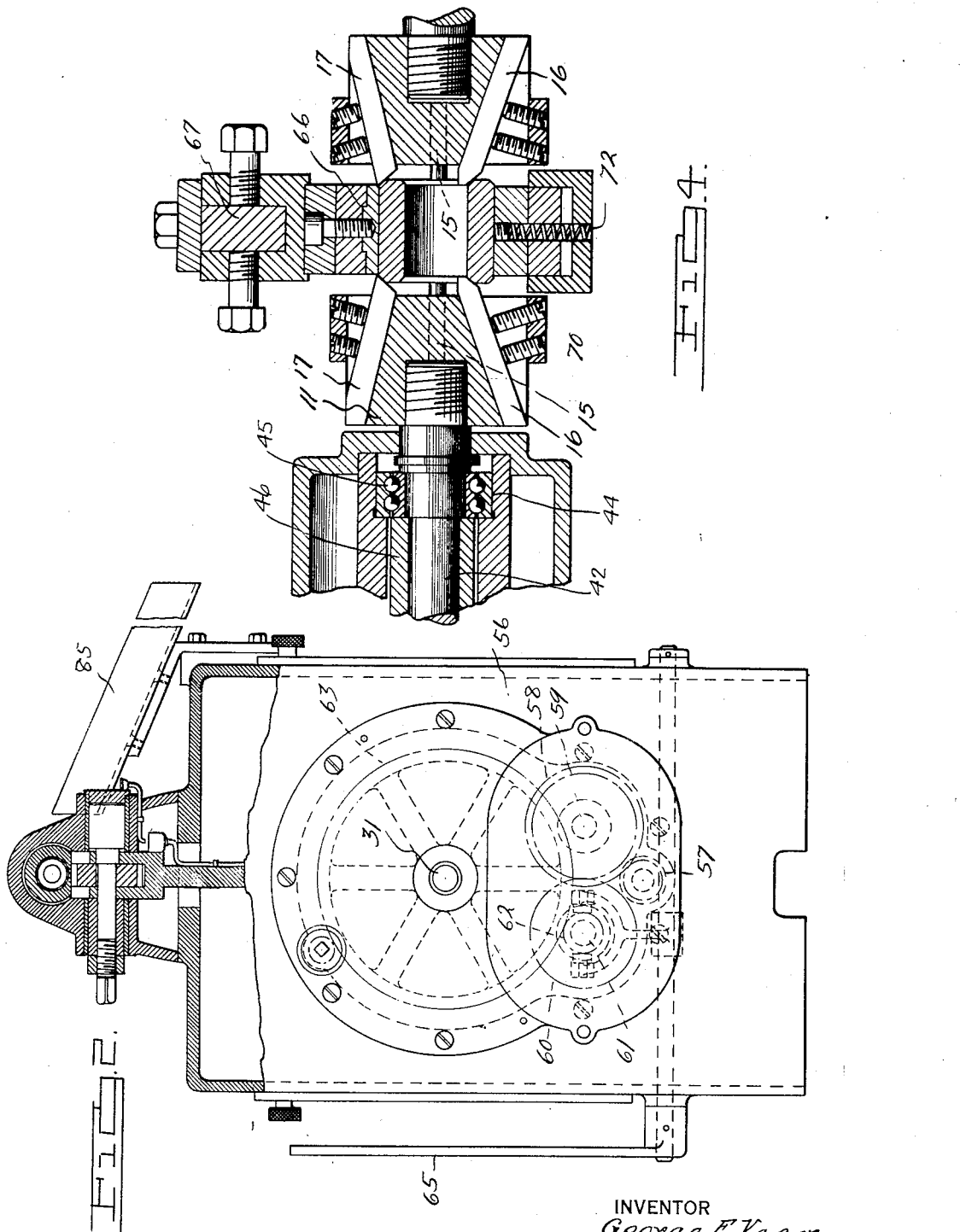
Figure 2 is a transverse sectional view through the machine taken substantially on the plane indicated by the line 2—2 of Figure 1.
Figure 3:
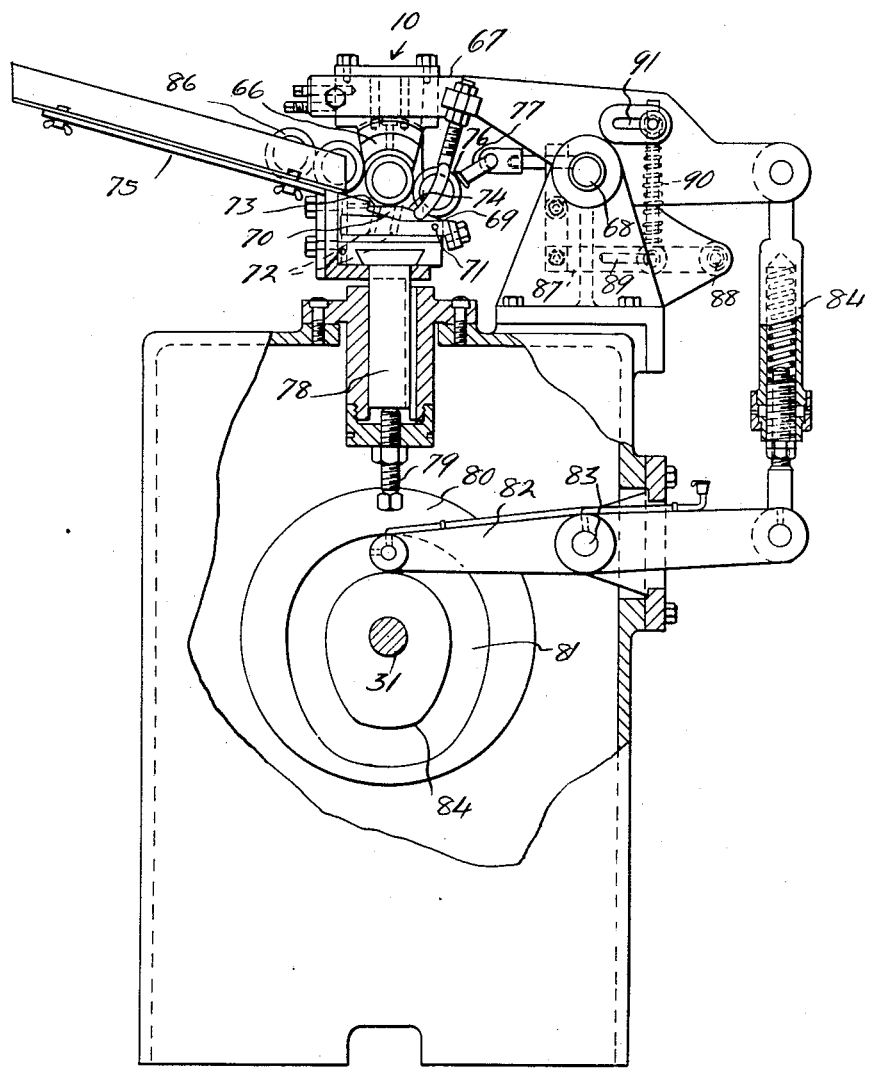
Figure 3 is a view similar to Figure 2 taken substantially on the plane indicated by the line 3—3 of Figure 1.

Referring now more in detail to the specific construction of workholder, illustrated herein, and with special reference to Figure 3 of the drawings, it will be observed that the holder 10 comprises an upper jaw 66 mounted upon a swinging arm 67 which in turn is pivotally connected intermediate the ends thereof upon the frame of the machine as at 68. The holder 10 is further provided with a lower jaw or anvil 69 adjustably mounted upon the frame of the machine, as will be presently described. The anvil 69 comprises a guide 70 pivotally mounted at one end upon the anvil as illustrated at 71 and normally urged upwardly by means of suitable coil springs 72. The free end of the guide 70 is formed with a substantially flat bushing supporting surface 73 as distinguished from the remaining bushing engaging surface 74 which is inclined downwardly from the surface 73 and arranged in alignment with the bushing feeding platform 75 as clearly shown in Figure 2. The platform 75 is so arranged upon the machine as to feed the bushings into the machine in operative relation to the clamping jaw 66 by gravity. When the bushings are in operative relation to the jaw 66, the same rest upon the substantially flat surface 73 of the guide 70. The inclined surface 74 of the guide 70 is of sufficient area to accommodate one of the finished bushings, which as indicated by the reference character 76 in Figure 3 functions as a spacer for properly positioning the succeeding bushing in operative relation with the clamping jaw 66 and flat surface 73 of the anvil. In order to hold the finished bushing 76 in proper position so that the same accurately functions as a stop for the succeeding bushing, as set forth above, I provide a stop 77 carried by the swinging arm 67. The anvil 69 is supported upon a post 78 slidably engaging the frame of the machine and adapted to be adjusted by means of the threaded element 79. The construction is such as to permit movement of the anvil toward and away from the jaw 66 so as to vary the clamping force exerted upon the bushings and to compensate for bushings of varying diameter.

In order to automatically actuate the jaw 66 in timed relation to the reciprocation of the spindles, I provide a cam 80 secured to the cam shaft 31 and having a cam groove 81 therein adapted to receive one end of a rocklever 82. The rocklever 82 is pivoted intermediate the ends thereof as at 83 to the frame of the machine and has the opposite end thereof connected to the free end of the arm 67 by means of an adjustable link 84. The cam groove 81 is so designed as to rock the jaw 66 out of clamping engagement with the bushing as the cutter heads 11 and 12 are moved away from the bushing and to move the jaw 66 into clamping engagement with the next bushing to be operated upon during the interval that the cutter heads 11 and 12 are being moved toward the workholder. Referring now briefly to the operation of the mechanism just described and assuming that the parts are in the position illustrated in Figure 3 and also that the cutter heads are being moved away from the bushing being operated upon, it will be noted that as the high point of the cam designated by the reference character 84 is moved upwardly the lever 82 will be rocked about its pivot 83 transmitting a corresponding rocking movement to the lever 67 through the link 84. A corresponding rocking movement of the lever 67 effects an upward movement of jaw 66 and stop mechanism 77 permitting the bushing 76 to roll off of the inclined surface 74 into the gravity discharge chute 85 and permitting the guide member 70 to move upwardly under the action of the spring 72. Movement of the guide 70, as specified, causes the bushing just completed to move on to the inclined surface 74 of the guide. As the bushing just completed is moved upon the surface 74 the next succeeding bushing designated by the reference character 86 on the platform 75 is permitted to assume a position in operative relation with the jaw 66 and in engagement with the finished bushing on the inclined surface 74 of the guide 70. It should be understood that during the time the finished bushing is moved out of operative relation with the jaw 66, the arm 67 is being lowered by the cam and since the stop 77 is located a substantial distance below the arm 67, the same will engage the finished bushing prior to the jaw 66 being lowered into clamping engagement with the bushing 86. The bushing 86 then remains in clamping engagement within the workholder until the cutter heads 11 and 12 have completed the cutting operation at which time the cam 80 will again function to release the bushing 86 and clamp the next succeeding bushing as outlined above.

Referring more in detail to the manner in which the stop 77 is movable with the arm 67, it will be noted that this stop is mounted upon an L-shaped arm 87 having one end pivotally mounted upon one end of the machine as at 88 and having an elongated slot 89 therein intermediate the ends adapted to slidably engage one end of a rod 90 having the opposite end slidably mounted in a slot 91 formed in the arm 67. The arrangement is such as to permit the rod 90, establishing a connection between the stop lever and arm 67, to be adjusted longitudinally toward or away from the pivital connection 68 between the arm 67 and frame of the machine and thereby vary the throw of the stop 77 upon a swinging movement of the arm 67. As stated above, the link 84 connecting the arm 82 with the arm 67 is capable of being adjusted. By virtue of this adjustment the lift of the jaw 66 may be accurately adjusted to compensate for bushings of varying dimension.

In fashioning certain classes of work it may be found desirable to utilize the machine without automatically reciprocating the spindles 13 and 14. When this is the case, the clutch 64 is merely disengaged to discontinue operation of the cam shaft and accordingly the cams 32 and 33. When the machine is used in this manner, the cutter heads 11 and 12 may be accurately adjusted to fashion a bushing or like member to very close limits. This is accomplished by providing micrometer adjustments 92 for accurately varying the positions of the cutter heads relative to the bushing and for manually feeding the heads toward and away from the bushing.

In order to initially set up the machine for the particular class of work it is desired to fashion and to facilitate adjustment of the various parts of the machine, I provide a hand operated crank mechanism 93 for rotating the cam shaft. This mechanism comprises a stub shaft 94 journaled within a wall of the casing 18 having one end fashioned to receive a crank handle (not shown) and having a gear 95 upon the opposite end thereof adapted to mesh with the gear 63 on the cam shaft. As stated above, this mechanism finds particular utility when the machine is initially set up for obtaining the desired adjustments. Moreover the above arrangement permits the cutter heads 11 and 12 to be fed manually to their approximate positions relative to the bushing and then accurately positioned by means of the micrometer adjustments 92 set forth above.

Thus from the foregoing it will be observed that I have provided a comparatively simple machine automatically operable to simultaneously chamfer both the inner and outer edge portions of the opposite ends of the bushing and also to fashion the bushing to a predetermined size by finishing the ends thereof. It will further be apparent that I have provided a machine capable of performing the above functions expediently with the result that production may be greatly increased with the minimum amount of cost.

What I claim as my invention is:

1. In a machine of the class described, a frame, a bracket rising from the frame, a work holder arm pivotally mounted on the bracket, a work stop including a substantially L-shaped arm pivoted upon the bracket, means for actuating the work holder arm, and an operating connection between said arm and stop including a part terminally connected and adjustable relative to said work holder arm and the base of said L-shaped arm.

2. In a machine of the class described, a frame, an anvil adjustably mounted upon the frame, a bracket rising from the frame at one side of the anvil, a guide for the work pivotally mounted upon the anvil, a chute for delivering work on to the guide, a work holder arm pivotally mounted upon the bracket and extending over the guide, and a work stop adjacent the guide and carried by said work holder arm.

3. In a machine of the class described, a work holder including a support for the work, a jaw for holding the work on the support, a stop for the work adjacent the support, and actuating means for the stop including actuating means for the jaw.

4. In a machine of the class described, a work holder including a support for the work, a jaw for holding the work on the support, an arm for actuating the jaw, and a stop for the work disposed adjacent the support and actuable by said arm.

5. In a machine of the class described, a work holder including a support for the work, a jaw for holding the work on the support, a movable work engaging stop adjacent the support, and actuating means for the jaw including a movable arm, and actuating means for the stop including an arm connected to the arm just mentioned.

6. In a machine of the class described, a work holder including a movable work engaging jaw, a movable work engaging stop, actuating means for the jaw including a pivotally mounted arm, and actuating means for the stop including a pivotally mounted arm, and a driving connection between said arms adjustable to vary the throw of said stop.

7. In a machine of the class described, a work holder including a movable work engaging jaw, a movable work engaging stop adjacent the jaw, actuating means for the jaw including an arm adjustable to vary the movement of the jaw, and a driving connection between said arm and stop including means adjustable to vary the throw of the stop.

8. In a machine of the class described, a work chute, and means for supporting work from the chute, including an anvil having a spring actuated part provided with two substantially flat surfaces that are disposed at substantially an obtuse angle to each other and are adapted to be successively engaged by work from the chute.

9. In a machine of the class described, a work chute, and means for supporting work from the chute, including an anvil having a pivotally mounted part provided with two substantially flat surfaces for engagement by the work, one of said surfaces being normally at substantially an acute angle to the chute and adapted to support the work while it is being worked upon, and the other of said surfaces being normally substantially in alignment with the work chute and adapted to support the work after it has been worked upon.

10. In a machine of the class described, a work chute, and means for receiving work from the chute, including an anvil having a part provided with two substantially flat surfaces for engagement by the work, one of said surfaces being normally at substantially an acute angle to the chute, and adapted to support the work while it is being worked upon, and the other of said surfaces being normally in substantial alignment with the chute and adapted to support the work after it has been worked upon, a jaw movable above the anvil for holding the work on the first mentioned surfaces, and a stop for the work adjacent the other of said surfaces.

11. In a machine of the class described, a pair of aligned rotary spindles, cutter heads carried by the opposed ends of said spindles, means between said cutter heads for holding the work, cutters carried by said heads for chamfering simultaneously the inner and outer edges of opposite ends of the work held by said means, and means for rotating said spindles in opposite directions but at substantially the same speed so that both ends of the work will be finished simultaneously.

12. In a machine of the class described, a frame, a post adjustable in said frame, a work chute adjacent the post, and means for supporting work from the chute, including an anvil carried by the post and having a part engageable by work from the chute.

13. In a machine of the class described, a spindle mounted for rotary and longitudinal movements, a cutter head carried by the spindle, and means for adjusting the cutter head so that the work may be fashioned to very close limits, including a micrometer adjustment for the spindle.

GEORGE F. YAGER.